United States Patent
Roch et al.

(10) Patent No.: US 9,680,745 B2
(45) Date of Patent: Jun. 13, 2017

(54) MULTI-DOMAIN SOURCE ROUTED FORWARDING BASED ON COLLABORATING NETWORK CONTROLLERS

(71) Applicant: Huawei Technologies Co., Ltd., Shenzhen (CN)

(72) Inventors: Evelyne Roch, Gatineau (CA); Peter Ashwood-Smith, Gatineau (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

(21) Appl. No.: 14/159,072

(22) Filed: Jan. 20, 2014

(65) Prior Publication Data

US 2015/0207736 A1   Jul. 23, 2015

(51) Int. Cl.
| | |
|---|---|
| *H04L 12/741* | (2013.01) |
| *H04L 12/721* | (2013.01) |
| *H04L 12/717* | (2013.01) |
| *H04L 12/723* | (2013.01) |
| *H04L 12/749* | (2013.01) |
| *H04L 12/715* | (2013.01) |

(52) U.S. Cl.
CPC ............ *H04L 45/745* (2013.01); *H04L 45/34* (2013.01); *H04L 45/04* (2013.01); *H04L 45/42* (2013.01); *H04L 45/50* (2013.01); *H04L 45/741* (2013.01)

(58) Field of Classification Search
CPC ..... H04L 45/50; H04L 45/741; H04L 45/745; H04L 45/34; H04L 45/42; H04L 49/2009; H04L 45/04; H04L 45/02

USPC ........................................................ 370/393
See application file for complete search history.

(56) References Cited

U.S. PATENT DOCUMENTS 6,151,324 A * 11/2000 Belser ................ H04L 12/4608
                                                              370/355
6,529,958 B1    3/2003 Oba et al.
(Continued)

FOREIGN PATENT DOCUMENTS

EP           2073462 A1     6/2009

OTHER PUBLICATIONS

"Notification of Transmittal of the International Search Report and the Written Opinion of the International Searching Authority, or the Declaration," Applicant: Huawei Technologies Co., Ltd., PCT/US15/11919, mailed Apr. 17, 2015, 9 pages.

(Continued)

*Primary Examiner* — Jeffrey M Rutkowski
*Assistant Examiner* — Shah Rahman
(74) *Attorney, Agent, or Firm* — Slater Matsil, LLP

(57) ABSTRACT

Efficient and scalable source routed forwarding can be achieved in multi-domain networks by substituting path identifiers for intra-domain hop lists in source route hop lists. The path identifiers are then replaced with the corresponding intra-domain hop lists at the ingress edge nodes of each corresponding domain. The path identifiers do not specify individual hops along an intra-domain path segment, and are therefore typically shorter than the intra-domain hop lists. To facilitate multi-domain source routed forwarding techniques, routing tables in edge nodes of the corresponding domains are updated to associate the path identifiers with the corresponding intra-domain hop lists during (or immediately following) inter-domain path computation.

20 Claims, 11 Drawing Sheets

(56) References Cited

U.S. PATENT DOCUMENTS

| | | | |
|---|---|---|---|
| 8,693,374 B1* | 4/2014 | Murphy | H04L 12/28 |
| | | | 370/255 |
| 8,705,513 B2* | 4/2014 | Van Der Merwe | H04L 47/72 |
| | | | 370/351 |
| 2002/0181402 A1* | 12/2002 | Lemoff | H04L 45/26 |
| | | | 370/238 |
| 2005/0083936 A1 | 4/2005 | Ma | |
| 2005/0149531 A1 | 7/2005 | Srivastava | |
| 2006/0039391 A1* | 2/2006 | Vasseur | H04L 45/04 |
| | | | 370/409 |
| 2006/0098657 A1 | 5/2006 | Vasseur et al. | |
| 2010/0296393 A1* | 11/2010 | Owens | H04L 29/06 |
| | | | 370/225 |
| 2012/0106560 A1* | 5/2012 | Gumaste | H04L 45/04 |
| | | | 370/401 |
| 2012/0188906 A1 | 7/2012 | Ong | |
| 2013/0294455 A1 | 11/2013 | Chen et al. | |
| 2014/0177638 A1* | 6/2014 | Bragg | H04L 45/50 |
| | | | 370/395.5 |

OTHER PUBLICATIONS

Filsfils, C., et al., "Segment Routing Architecture," Network Working Group Internet-Draft, Oct. 21, 2013, 28 pages.
Bradford, R., et al., "Preserving Topology Confidentiality in Inter-Domain Path Computation Using a Path-Key-Based Mechanism," RFC 5520, Apr. 2009, 19 pages.

* cited by examiner

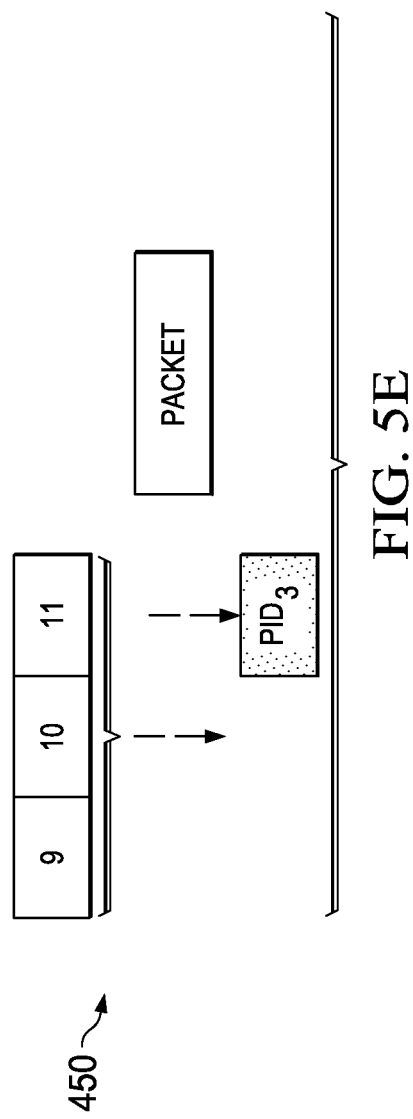
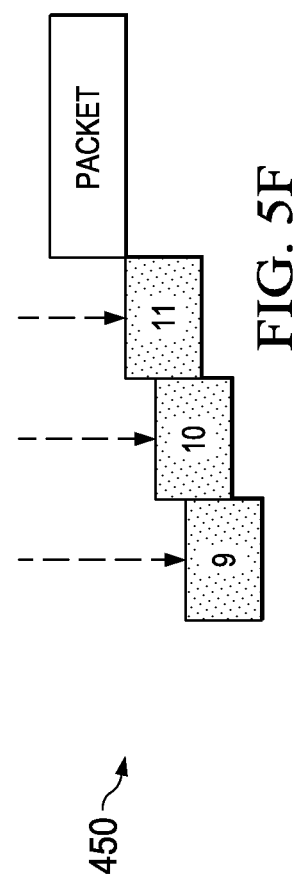

MULTI-DOMAIN SOURCE ROUTED FORWARDING BASED ON COLLABORATING NETWORK CONTROLLERS

TECHNICAL FIELD

The present invention relates generally to telecommunication networks, and in particular embodiments, to techniques and mechanisms for multi-domain source routed forwarding based on collaborating network controllers.

BACKGROUND

Source routed forwarding allows a sender of a packet to partially or completely specify the route a packet takes through a network, which is advantageous in so far as it reduces packet re-ordering and congestion by allowing the source to directly manage the traffic flow path. Generally speaking, source routed forwarding is achieved using a source route hop list that specifies each individual hop of a source routed path. The source route hop list is encapsulated within the packet header at the source node, and is used by each intermediate node to determine the next-hop for purposes of forwarding the packet. Conventional source routed forwarding techniques are often efficient in small networks, where the number of hops between the source and destination is relatively small. However, traditional source routed forwarding techniques may be somewhat inefficient in larger networks, where long packet headers increase overhead ratios. Moreover, source routed forwarding may not be possible in multi-domain networks, where the source lacks knowledge of external domain topologies. Accordingly, techniques for efficiently extending source domain routing to large and/or multi-domain networks is desired.

SUMMARY OF THE INVENTION

Technical advantages are generally achieved, by embodiments of this disclosure which describe techniques and mechanisms for multi-domain source routed forwarding based on collaborating network controllers.

In accordance with an embodiment, a method for source routed forwarding in multi-domain networks is provided. In this example, the method includes receiving a data packet over an inter-domain path. The data packet is appended with a packet header carrying a source route hop list. The source route hop list specifies a path identifier of an intra-domain path segment without specifying individual hops along the intra-domain path segment. The intra-domain path segment is a portion of the inter-domain path extending through a domain. The method further includes identifying a hop list associated with the path identifier, replacing the path identifier with the hop list in the source route hop list, and forwarding the data packet to a next hop. An apparatus for performing this method is also provided.

In accordance with another embodiment, a method for source routed forwarding is provided. In this example, the method includes receiving a request to compute an inter-domain path between a source node and a destination node, and obtaining a path identifier of an intra-domain path segment extending through a domain. The intra-domain path segment represents a portion of the inter-domain path. The method further includes constructing a source route hop list that specifies the path identifier without specifying individual hops along the intra-domain path segment, and sending the source route hop list to a device. The source route hop list is configured to be appended to a data packet at the source node prior to the data packet being communicated over the inter-domain path. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 4 illustrates a diagram of an embodiment inter-domain source routed path extending through a multi-domain network;

FIGS. 5A-5F illustrate diagrams of an embodiment source route hop list being modified as a packet is forwarded over an inter-domain source routed path;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Aspects of this disclosure achieve efficient/scalable source routed forwarding in multi-domain networks by using path identifiers in place of intra-domain hop lists in packet headers at the source node. The path identifiers (e.g., label, address, etc.) are then swapped with the intra-domain hop lists once the packets reach ingress edge nodes of corresponding domains to allow the packets to be forwarded over the corresponding intra-domain path segments. Notably, path identifiers do not specify individual hops along an intra-domain path segment, and are therefore typically shorter (e.g., include fewer bits) than the intra-domain hop lists. To facilitate embodiment source routed forwarding techniques provided herein, forwarding tables in edge nodes of the corresponding domains are updated to associate the path identifiers with the corresponding intra-domain hop lists. The forwarding table entries can be written into the forwarding tables following inter-domain path computation, and removed from the forwarding tables during path teardown. These and other aspects of this disclosure are described in greater detail below.

Figure 1A:
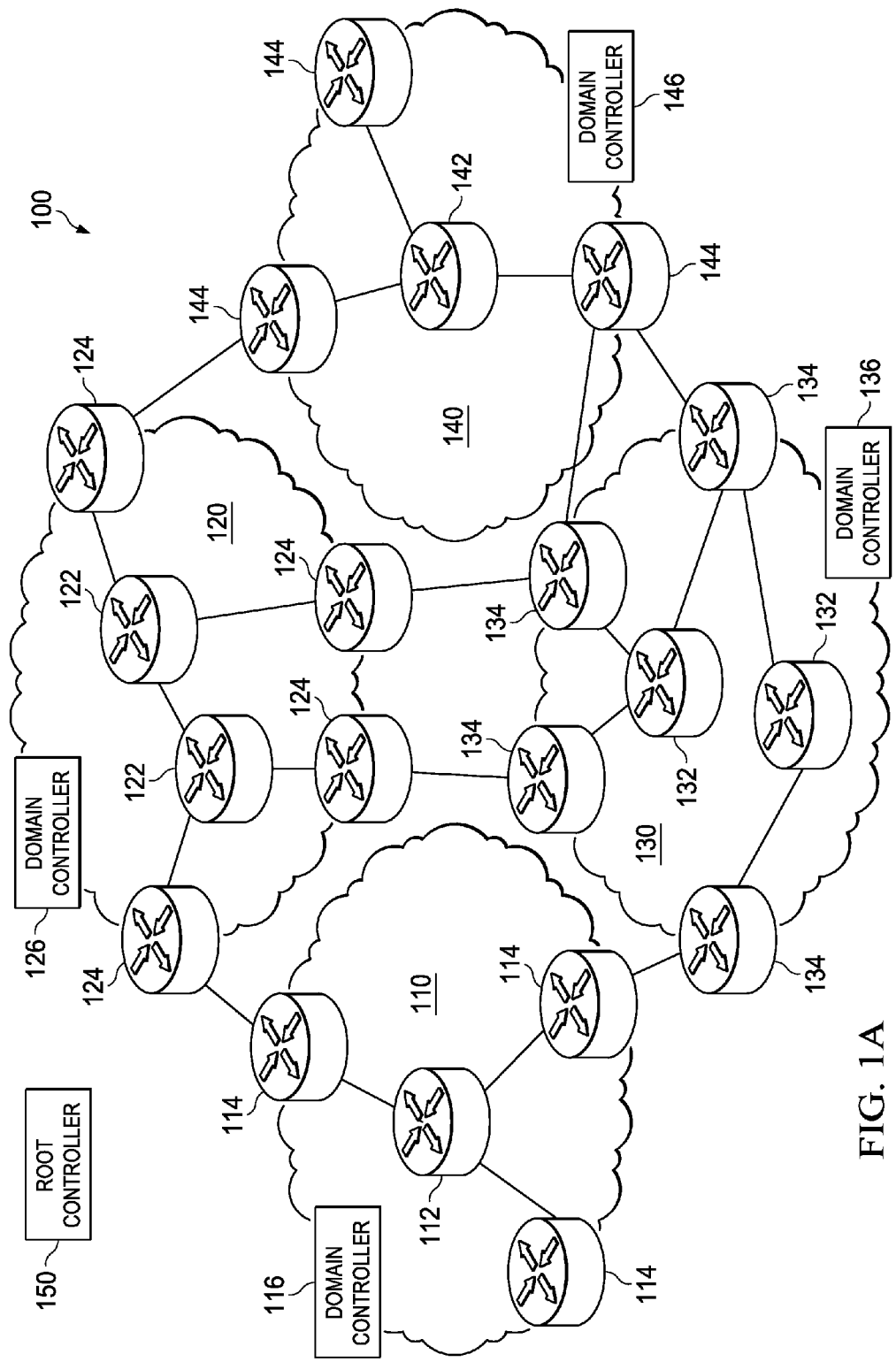
FIGS. 1A-1B illustrate diagrams of an embodiment communications network.
Figure 1B:
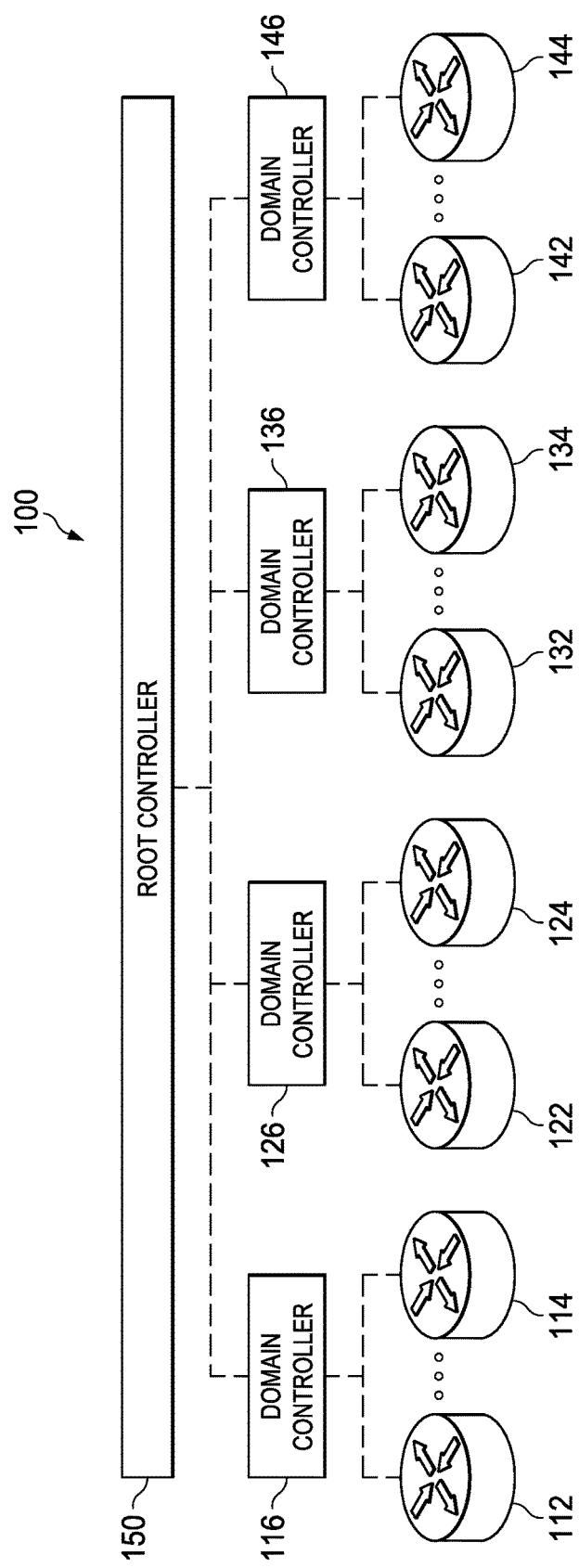

FIGS. 1A-1B illustrate an embodiment multi-domain network 100 that comprises a plurality of domains 110, 120, 130, 140, a plurality of core nodes 112, 122, 132, 142, a plurality of edge nodes 114, 124, 134, 144, a plurality of domain controllers 116, 126, 136, 146, and a root controller 150. As shown in FIG. 1A, the multi-domain network 100 includes a data-plane (solid lines) formed by interconnections between the core nodes 112, 122, 132, 142 and the edge nodes 114, 124, 134, 144 of the respective domains 110, 120, 130, 140. As shown in FIG. 1B, the multi-domain network 100 includes a control-plane (dotted lines) formed between the root controller 150, the domain controllers 116, 126, 136, 146 and the core/edge nodes 112-114, 122-124, 132-134, 142-144.

The core-nodes 112, 122, 132, 142 may be any data-plane element configured to perform intra-domain routing within their respective domains 110, 120, 130, 140. As an example, the core-nodes 112, 122, 132, 142 may have knowledge of the intra-domain topologies of their respective domains 110, 120, 130, 140, but may lack knowledge regarding inter-domain links and/or topologies of other domains. The edge nodes 114, 124, 134, 144 may be any data-plane element configured to provide or regulate entry into the domains 110, 120, 130, 140, and may include both intra-domain and inter-domain routing capabilities. In some embodiments, the edge nodes 114, 124, 134, 144 have knowledge of the intra-domain topologies of their respective domains 110, 120, 130, 140, as well as at least some knowledge of inter-domain links, e.g., knowledge of edge components in adjacent domains, etc. The domain controller) 16, 126, 136, 146 may be any control-plane entity that is capable of computing intra-domain path segments for their respective domains 110, 120, 130, 140. The root controller 150 may be any control-plane entity capable of computing/generating inter-domain paths, e.g., aggregating intra-domain path segments computed by the domain controllers 116, 126, 136, 146, selecting inter-domain links, etc. As used herein, the term "controller" (root, domain, or otherwise) refers to any control plane entity configured to facilitate multi-domain source routed forwarding. In some embodiments, root controllers include inter-domain path computation functionality, and domain controllers include intra-domain path computation functionality. Controllers can be stand-alone devices, or co-located with other network devices, e.g., a controller can be a module in an edge node, a domain controller can be co-located with a root controller, etc.

Figure 2:
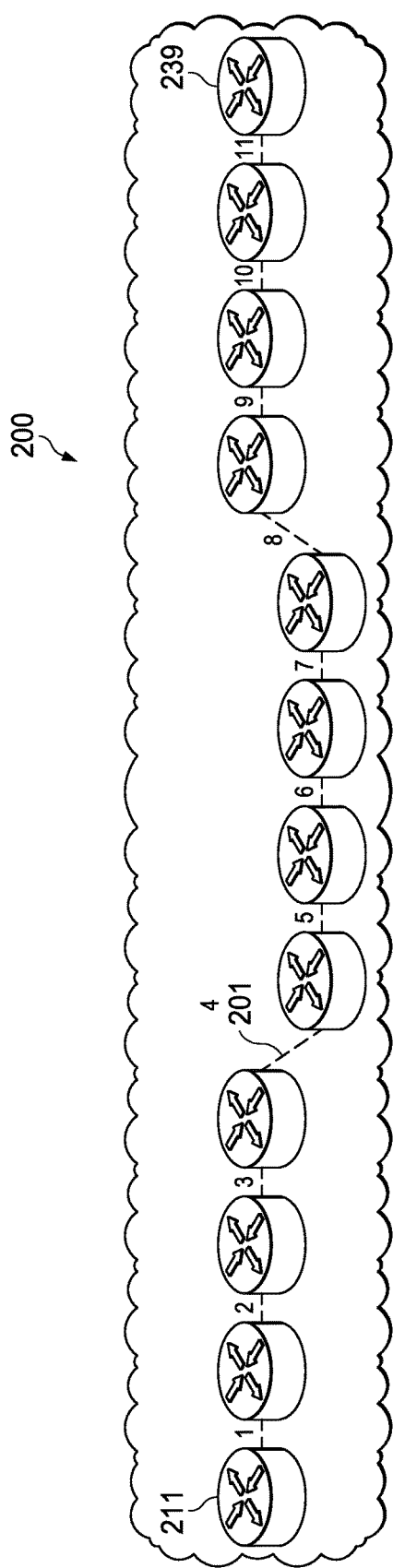
FIG. 2 illustrates a diagram of a conventional source routed path extending through a network.
Figure 3:
FIG. 3 illustrates a diagram of a source route hop list for a conventional source routed path.

Conventional source routed forwarding techniques may be difficult to implement in large networks because they typically require the source to have topological knowledge of the entire network. FIG. 2 illustrates a network 200 through which a path 201 extends from a source 211 to a destination 239. When conventional source routed forwarding techniques are used, the source 211 would need to have topological knowledge of the entire network 200, including knowledge of each of the hops 1-11 of the source routed path. Conventional source routed forwarding techniques may also be inefficient in large networks, as lengthy source route hop lists may significantly increase overhead in the data packet header. FIG. 3 illustrates a source-route hop list 250 for the path 201, as might be generated using conventional source-routing techniques. As shown, each of the hops 1-11 in the path 201 are specified in the source-route hop list 250. Moreover, conventional source routed forwarding techniques may be unsuitable for multi-domain networks, where source nodes lack topological knowledge of external domains.

Figures 4, 5A:
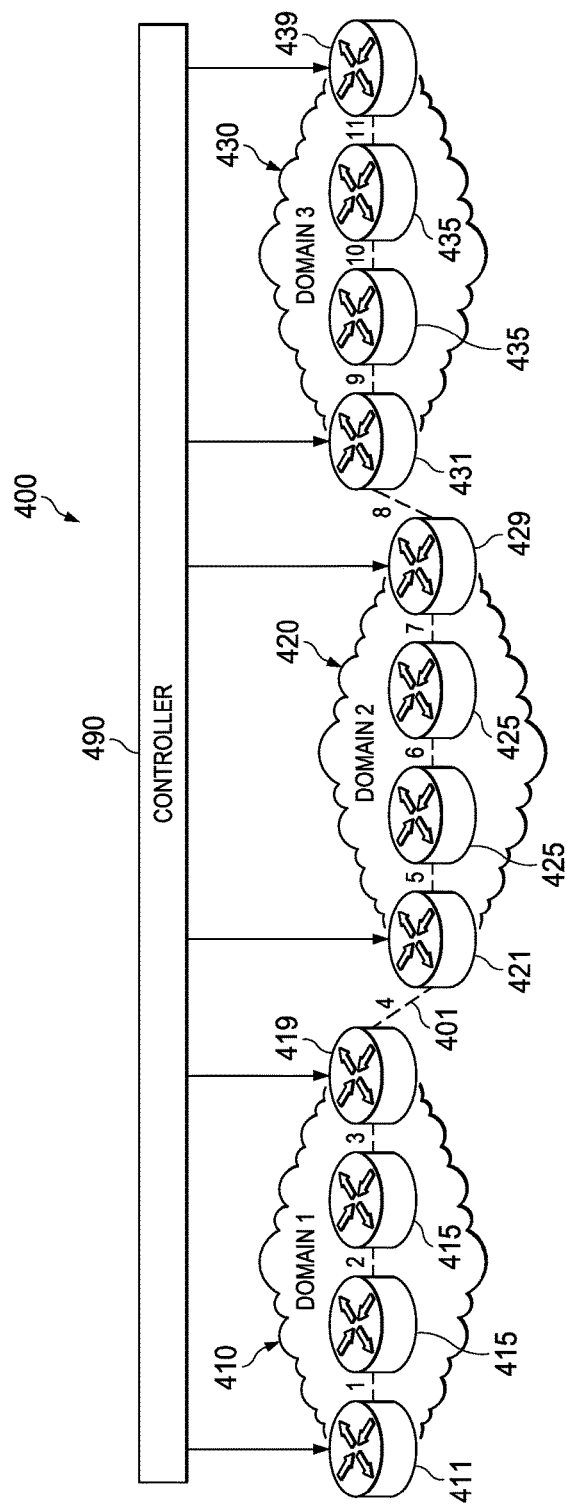

Aspects of this disclosure use path identifiers in source route hop lists to achieve efficient and scalable source-routing in large or multi-domain networks. FIG. 4 illustrates an embodiment network 400 through which an inter-domain source-routed path 401 extends from a source 411 to a destination 439. As shown, the embodiment network 400 includes a plurality of domains 410, 420, 430, a plurality of edge nodes 419, 421, 429, 431, a plurality of core nodes 415, 425, 435, and a controller 490. In this example, path identifiers $PID_2$ and $PID_3$ are used to represent intra-domain path segments of the domains 420, 430, which can be seen in the source route hop list 450 depicted in FIG. 5A. The controller 490 performs inter-domain path computation to compute the inter-domain source-routed path 401. Thereafter, the controller 490 instructs the edge nodes 421, 431 to update their forwarding tables to associate the path identifiers $PID_2$ and $PID_3$ with intra-domain hop lists corresponding to intra-domain path segments of the domains 420, 430, respectively. Specifically, an entry is written into the forwarding table at the edge node 421 to associate the path identifier $PID_2$ with an intra-domain hop list 5-6-7, while an entry is written into the forwarding table at the edge node 431 to associate the path identifier $PID_3$ with an intra-domain hop list 9-10-11. The edge nodes 421, 431 are ingress edge nodes for the domains 420, 430 (respectively), and are configured to replace the path identifiers $PID_2$, $PID_3$ with the corresponding intra-domain hop lists 5-6-7, 9-10-11 (respectively) upon receiving packets carrying those identifiers. As used herein, the term "source routed path" refers to any path that is established, or otherwise used, in conjunction with source routed forwarding principles. The term "source route hop list" refers to a hop-list associated with a source routed path. The term "intra-domain hop list" refers to a hop list associated with an intra-domain path segment, e.g., a segment of a source routed path extending through a domain.

Figure 5B:
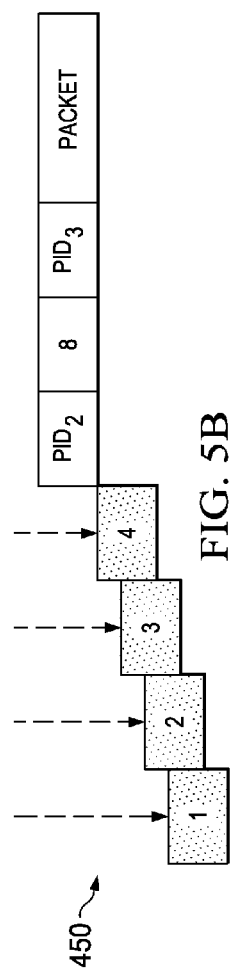
Figure 5C:
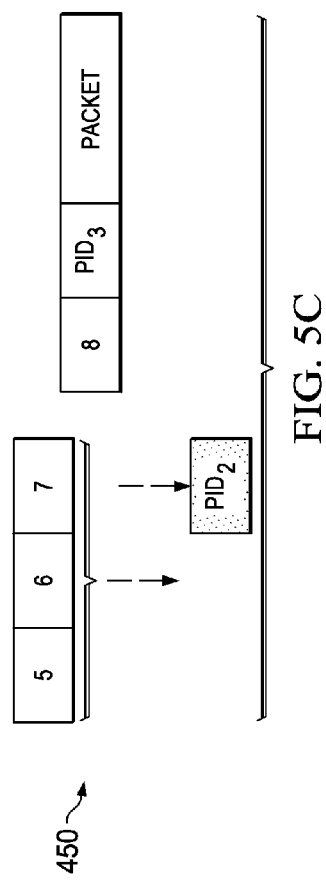
Figure 5D:
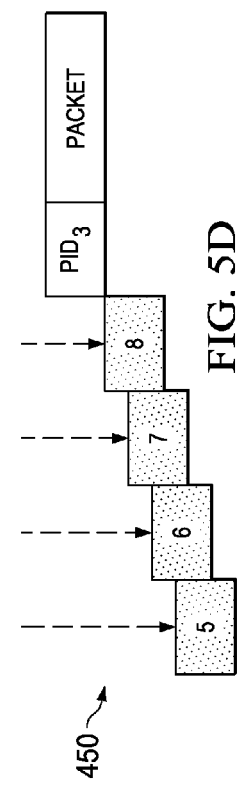

The FIGS. 5A-5F illustrate how the source route hop list 450 is modified as the packet is forwarded over the inter-domain source-routed path 401. As shown in FIG. 5A, the source route hop list 450 includes path identifiers $PID_2$ and $PID_3$. Thereafter, the individual hops 1-2-3-4 are removed one by one from the source route hop list 450 as the packet is forwarded from the source 411 to the edge node 421, as demonstrated by FIG. 5B. The edge node 421 then substitutes the intra-domain hop list 5-6-7 for the $PID_2$ (as shown in FIG. 5C) before sending the packet over the intra-domain path segment extending through the domain 420. As the packet is forwarded from the edge node 421 to the edge node 431, the individual hops 5-6-7-8 are removed one by one from the source route hop list 450 (as shown in FIG. 5D). Upon receiving the packet, the edge node 431 substitutes the intra-domain hop list 9-10-11 for the $PID_3$ (as shown in FIG. 5E) in the source route hop list 450, and forwards the modified packet to the next hop node 435 in the domain 430. Finally, the individual hops 9-10-11 are removed one by one from the source route hop list 450 as the packet is forwarded through the domain 430 to the destination 439.

Figure 6:
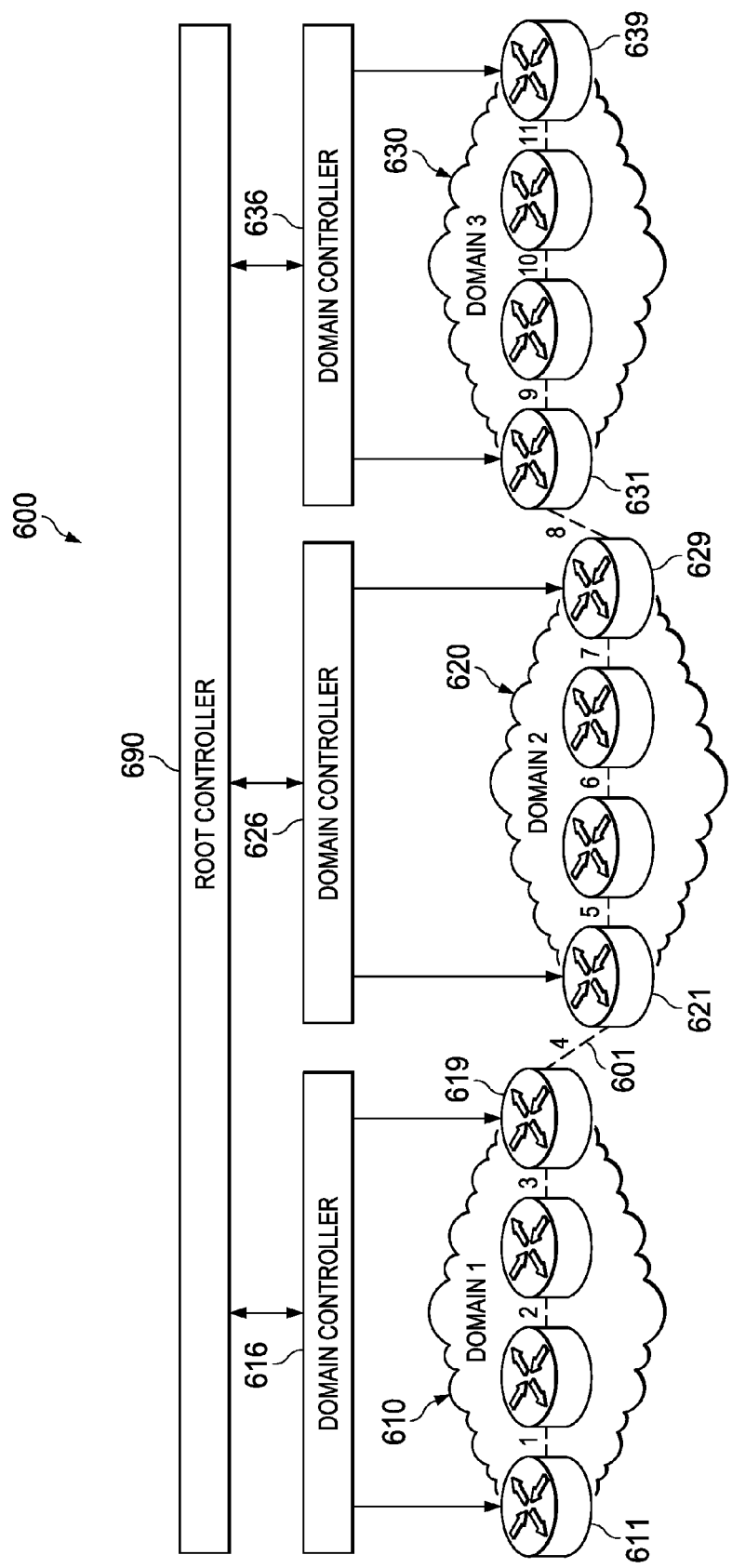
FIG. 6 illustrates a diagram of another embodiment inter-domain source routed path extending through a multi-domain network.

In some embodiments, intra-domain path segments may be computed by distributed controllers. FIG. 6 illustrates an embodiment network 600 in which intra-domain segments of an inter-domain path 601 are computed by domain controllers 616, 626, 636. The domain controllers 616, 626, 636 can be distributed controllers. Alternatively, domain controllers 616, 626, 636 may be co-located with the root-controller. In this example, the domain controllers 616, 626, 636 are responsible for computing the intra-domain segments of their respective domains 610, 620, 630, and a root controller 690 is responsible for aggregating the intra-domain path segments and the inter-domain links 4, 8 to form the inter-domain path 601. The domain controllers 616, 626, 636 may also be responsible for communicating with data plane entities in their respective domains 610, 620, 630. For example, the domain controllers 626, 636 may instruct the edge nodes 621, 631 (respectively) to write and/or remove entries to/from their forwarding tables. In another example, the domain controller 616 may relay the inter-domain path computation requests/replies between the source 611 and the root controller 690. Alternatively, the source routed path computation requests/replies may be communicated directly between the source 611 and root controller 690.

Figure 7:
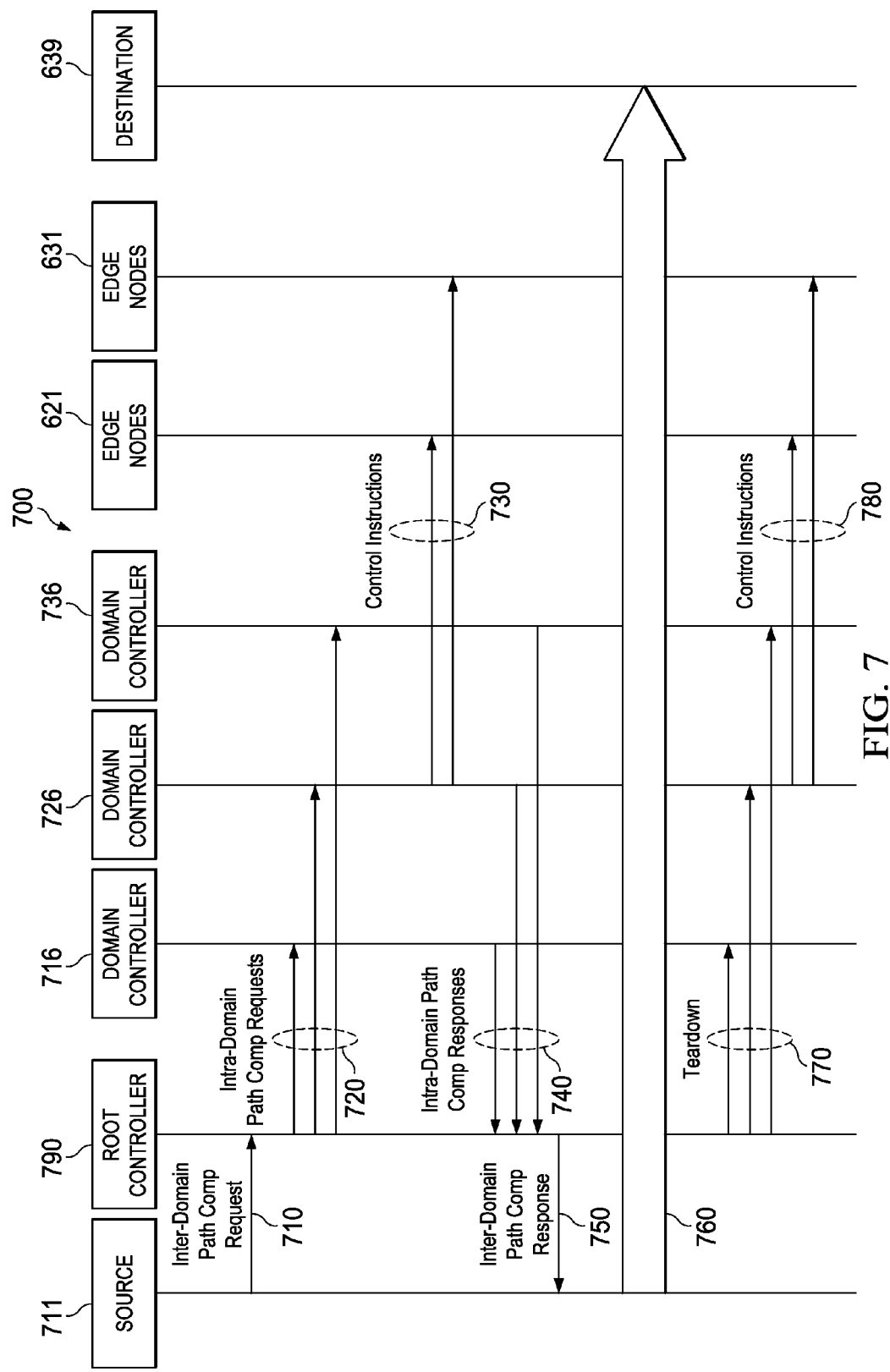
FIG. 7 illustrates a protocol diagram of an embodiment communications sequence for establishing an inter-domain source routed path.

FIG. 7 illustrates a communications sequence 700 for establishing an inter-domain path 601. As shown, the communications sequence 700 begins when an inter-domain path computation request 710 is sent from a source 611 to a root controller 690. The root controller 690 thereafter breaks the inter-domain path computation request 710 into multiple intra-domain path computation requests 720, which are forwarded to the domain controllers 616, 626, 636. Each of the intra-domain path computation requests 720 may request computation of an intra-domain path segment through a domain assigned to the corresponding domain controller. The domain controllers 616, 626, 636 compute the corresponding intra-domain path segments. Each intra-domain path segment is associated with, or defined by, an intra-domain hop list, which specifies a sequence of individual hops along the intra-domain path segment. The domain controllers 626, 636 associate path identifiers with the intra-domain hop lists, and then communicate control instructions 730 to the ingress edge nodes 621, 631. The control instructions 730 instruct the ingress edge nodes 621, 631 to write entries into their forwarding tables that associate the path identifiers with the intra-domain hop lists. Thereafter, the domain controllers 616, 626, 636 communicate intra-domain path computation responses 740 to the root controller 690 that indicate the intra-domain hop lists and/or the path identifiers. In one embodiment, the intra-domain path computation responses 740 specify an intra-domain hop list for domain 610 and path indicators for domains 620 and 630. Upon receiving the intra-domain path computation responses 740, the root controller 690 aggregates the intra-domain path segments into an inter-domain source routed path, and formulates a source route hop list for the inter-domain path. In an embodiment, the source route hop list includes the intra-domain hop list corresponding to domain 610, followed by an inter-domain hop 4, followed by a path identifier corresponding to domain 620, followed by an inter-domain hop 8, followed by a path indicator for domain 630. The root controller 690 communicates an inter-domain path computation response 750 specifying the source route hop list to the source 611, where the source route hop list is used to forward packets over the inter-domain path. Once communication of the packets is complete, the root controller 690 communicates teardown instructions 770 to the domain controllers 616, 626, 636. The teardown instructions 770 indicate that the inter-domain path is being torn down, and prompt the domain controllers 616, 636 to send control instructions 780 to the edge nodes 621, 631. The control instructions 780 instruct the edge nodes 621, 631 to remove the previously added entries from their forwarding tables.

Figures 8, 9:
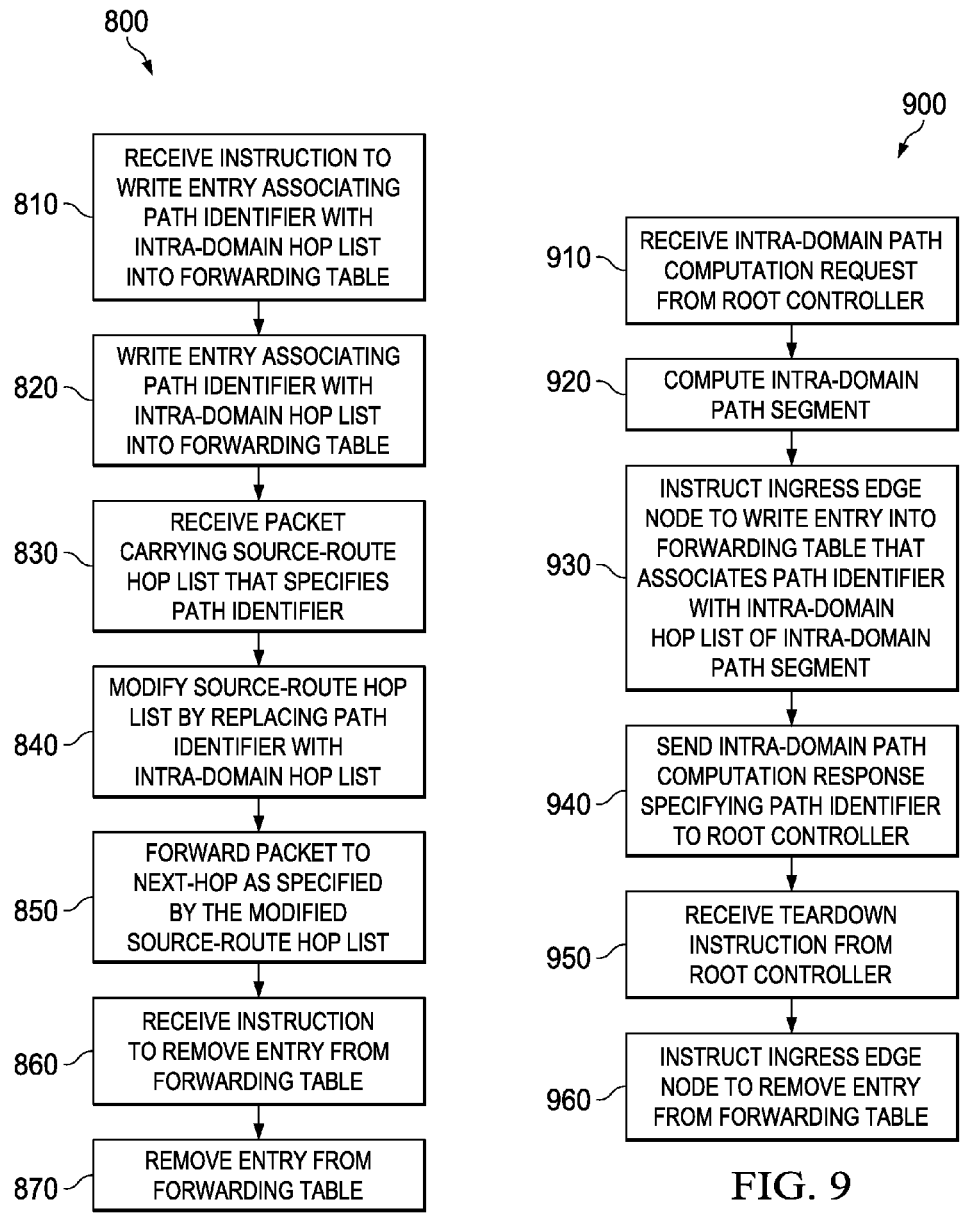
FIG. 8 illustrates a flowchart of an embodiment method for facilitating inter-domain source routed forwarding.
FIG. 9 illustrates a flowchart of another embodiment method for facilitating inter-domain source routed forwarding.

Aspects of this disclosure provide methods for operating edge nodes in accordance with the multi-domain source routed forwarding techniques described herein. FIG. 8 illustrates a method 800 for facilitating source routed forwarding in multi-domain networks, as might be performed by an edge node. As shown, the method 800 begins at step 810, where the edge node receives an instruction to write an entry into a database that associates a path identifier with an intra-domain hop list. Next, the method 800 proceeds to step 820, where the edge node writes the entry associating the path identifier with the intra-domain hop list into the forwarding table. Subsequently, the method 800 proceeds to step 830, the edge node receives a packet carrying a source route hop list that specifies the path identifier. Next, the method 800 proceeds to step 840, where the edge node modifies the source route hop list in the packet by replacing the path identifier with the associated intra-domain hop list. Thereafter, the method 800 proceeds to step 850, where the edge node forwards the packet to the next hop as specified by the modified source route hop list. The steps 830-850 may be repeated for each packet carrying the path identifier so long as the entry associating the path identifier with the intra-domain hop list is present in the forwarding table of the edge node. Once all packets relating to the service flow have been transported over the inter-domain path, the method 800 proceeds to step 860, where the edge node receives an instruction to remove the corresponding entry (e.g., entry added during step 820) from the forwarding table. Finally, the method 800 proceeds to step 870, where the edge node removes the corresponding entry from the forwarding table.

Aspects of this disclosure provide methods for operating controllers in accordance with the multi-domain source routed forwarding techniques described herein. FIG. 9 illustrates a method 900 for facilitating source routed forwarding in multi-domain networks, as might be performed by a domain controller. As shown, the method 900 begins at step 910, where the domain controller receives an intra-domain path computation request from a root controller. Thereafter, the method 900 proceeds to step 920, where the domain controller computes an intra-domain path segment. Next, the method 900 proceeds to step 930, where the domain controller instructs an ingress edge node to write an entry into a forwarding table associating a path identifier with an intra-domain hop list of the computed intra-domain path segment. Subsequently, the method 900 proceeds to step 940, where the domain controller sends an intra-domain path computation response specifying the path identifier to a root controller. Thereafter, the method 900 proceeds to step 950, where the domain controller receives a teardown instruction from the root controller. The teardown instruction is typically communicated once communication over the inter-domain path has been completed. The method 900 then proceeds to step 960, where the domain controller instructs the ingress node to remove the previously added entry from the forwarding table.

Figure 10:
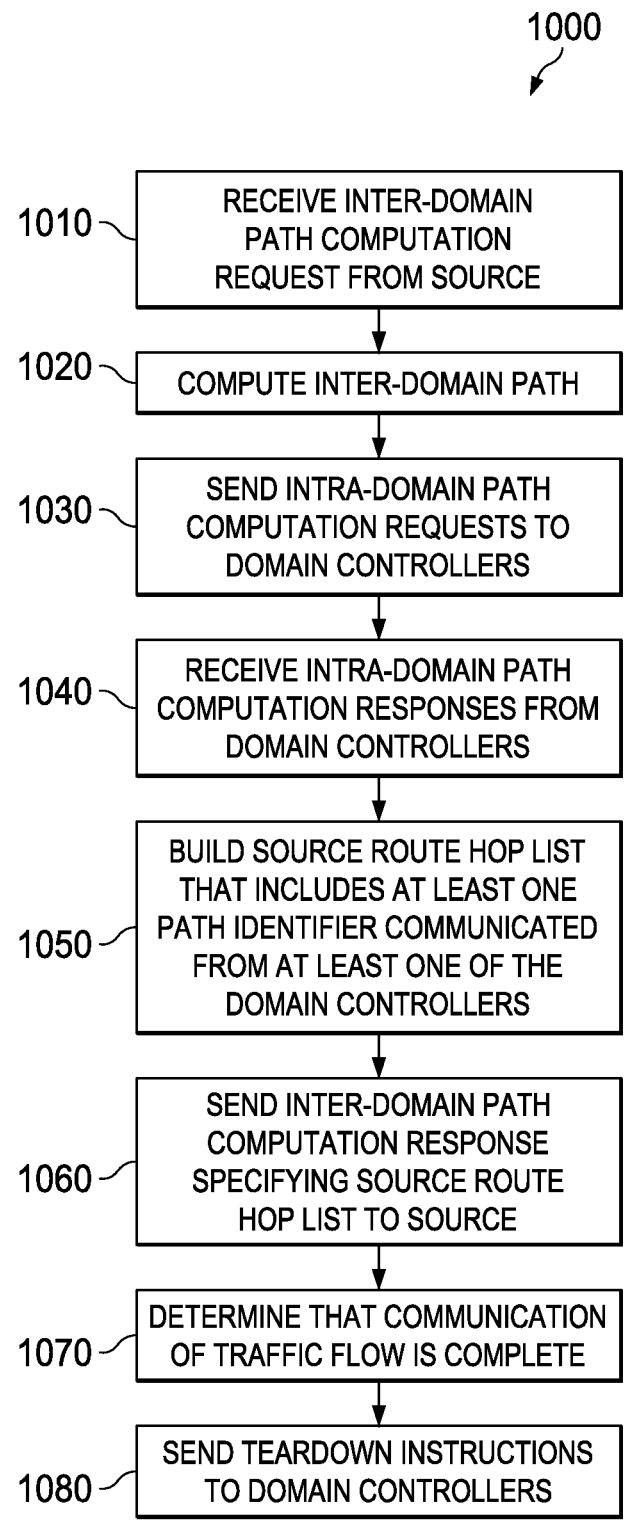
FIG. 10 illustrates a flowchart of yet another embodiment method for facilitating inter-domain source routed forwarding.

FIG. 10 illustrates a method 1000 for facilitating source routed forwarding in multi-domain networks, as might be performed by a root controller. As shown, the method 1000 begins at step 1010, where the root controller receives an inter-domain path computation request from a source. In some embodiments, the inter-domain path computation request is relayed to the root controller by a corresponding domain controller. In other embodiments, the inter-domain path computation request is received directly from the source node. Subsequently, the method 1000 proceeds to step 1020, where the root controller computes the inter-domain path by selecting the sequence of domains and inter-domain links. Next, the method 1000 proceeds to step 1030, where the root controller sends intra-domain path computation requests to corresponding domain controllers. The intra-domain path computation requests may instruct the domain controllers to compute intra-domain path segments through their respective domains. Thereafter, the method 1000 proceeds to step 1040, where the root controller receives intra-domain path computation responses from the domain controllers. The intra-domain path computation responses may carry path identifiers and/or intra-domain hop lists associated with intra-domain path segments computed by the domain controllers. In some embodiments, intra-domain path computation responses that specify a path identifier may exclude intra-domain hop list, and vice-versa. Subsequently, the method 1000 proceeds to step 1050, where the root controller builds a source route hop list for the computed inter-domain path by aggregating the intra-domain paths computed by the domain controllers and the selected inter-domain links. The source route hop list includes at least one path identifier communicated from the domain controllers. Thereafter, the method 1000 proceeds to step 1060, where the root controller sends an inter-domain computation response specifying the source route hop list to the source. The inter-domain computation response may be sent directly to the source, or relayed via a corresponding domain controller. Next, the method 1000 proceeds to step 1070, where the root controller determines that communication over the intra-domain path is complete, e.g. upon receiving a path teardown request. Thereafter, the method 1000 proceeds to step 1080, the root controller sends teardown instructions to the domain controllers.

Figure 11:
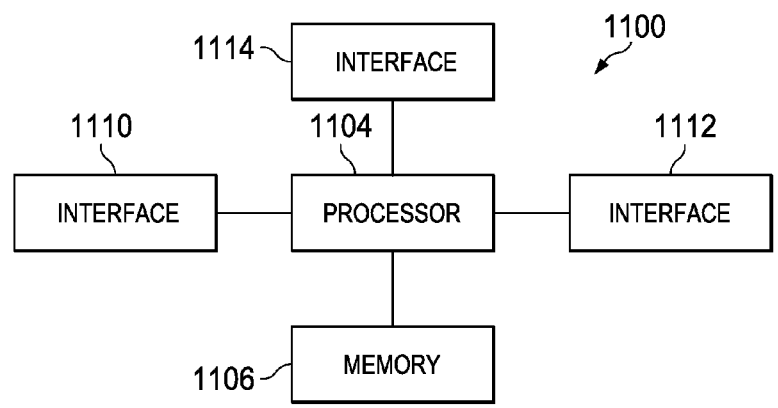
FIG. 11 illustrates a diagram of an embodiment network device.

FIG. 11 illustrates a block diagram of an embodiment device 1100, which may be equivalent to one or more devices (e.g., control plane entities, data plane entities, nodes, controllers, etc.) discussed above. The embodiment device 1100 may include a processor 1104, a memory 1106, and a plurality of interfaces 1110-1114, which may (or may not) be arranged as shown in FIG. 11. The processor 1104 may be any component capable of performing computations and/or other processing related tasks, and the memory 1106 may be any component capable of storing programming and/or instructions for the processor 1104. The interfaces 1110, 1112, 1114 may be any component or collection of components that allows the embodiment device 1100 to communicate with other network devices.

Figure 12:
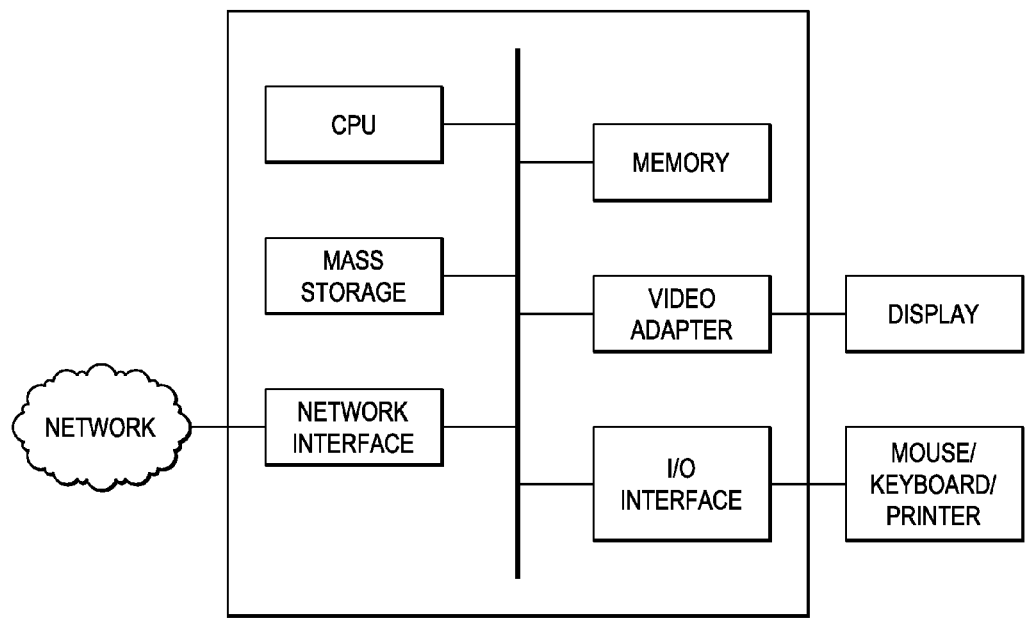
FIG. 12 illustrates a diagram of an embodiment computing platform.

FIG. 12 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for source routed forwarding in a network, the method comprising:

receiving, by an edge node in a domain, a first data packet of a traffic flow over an inter-domain path, the first data packet preceding every other data packet in the traffic flow, the inter-domain path being a source-routed path traversing a route specified by a source of the first data packet, the first data packet appended with a packet header carrying a source route hop list, wherein the source route hop list specifies a path identifier of an intra-domain path segment without specifying individual hops along the intra-domain path segment, and wherein the intra-domain path segment is a portion of the inter-domain path that extends through the domain;

identifying, by the edge node, a hop list associated with the path identifier, the hop list specifying a sequence of next-hop addresses along the intra-domain path segment;

replacing the path identifier with the hop list in the packet header such that the next-hop addresses along the intra-domain path segment can be read directly from the packet header by intermediate nodes on the intra-domain path segment; and forwarding the first data packet to a next hop of the intra-domain path segment in accordance with the hop list.

2. The method of claim 1, wherein identifying the hop list associated with the path identifier comprises:

locating an entry associating the path identifier with the hop list in a forwarding table stored at the edge node.

3. The method of claim 2, wherein the edge node identifies the hop list without querying external devices during a period between receiving the first data packet and forwarding the first data packet.

4. The method of claim 3, further comprising:

receiving, by the edge node, a first control message from a controller prior to receiving the first data packet over the inter-domain path, the first control message instructing the edge node to write the entry into the forwarding table; and receiving, by the edge node, a second control message from the controller after forwarding the first data packet to the next hop of the intra-domain path segment, the second control message instructing the edge node to remove the entry from the forwarding table.

5. The method of claim 1, wherein the first data packet carries data, and wherein forwarding the first data packet to the next hop comprises forwarding the first data packet over a data plane of the network.

6. The method of claim 1, wherein a length of the path identifier is shorter than a length of the hop list.

7. The method of claim 1, wherein the path identifier comprises a Multiprotocol Label Switching (MPLS) label.

8. The method of claim 1, wherein the path identifier comprises an internet protocol (IP) version four (IPv4) or IP version six (IPv6) address.

9. The method of claim 1, wherein the path identifier comprises a type length value (TLV) encoding.

10. An edge node in a domain, the edge node comprising:
a processor; and
a computer readable storage medium storing programming for execution by the processor, the programming including instructions to:
receive a first data packet of a traffic flow over an inter-domain path, the first data packet preceding every other data packet in the traffic flow, the inter-domain path being a source-routed path traversing a route specified by a source of the first data packet, the first data packet appended with a packet header carrying a source route hop list, wherein the source route hop list specifies a path identifier of an intra-domain path segment without specifying individual hops along the intra-domain path segment, and wherein the intra-domain path segment is a portion of the inter-domain path that extends through the domain;

identify a hop list associated with the path identifier, the hop list specifying a sequence of next-hop addresses along the intra-domain path segment;

replace the path identifier with the hop list in the packet header such that the next-hop addresses can be read directly from the packet header by intermediate nodes on the intra-domain path segment; and forward the first data packet to a next hop of the intra-domain path segment in accordance with the hop list.

11. The edge node of claim 10, wherein the instructions to identify the hop list associated with the path identifier include instructions to:

locate an entry associating the path identifier with the hop list in a forwarding table stored at the edge node.

12. The edge node of claim 10, wherein the path identifier comprises one of a Multiprotocol Label Switching (MPLS) label, an internet protocol (IP) version four (IPv4) address, an IP version six (IPv6) address, and a type length value (TLV) encoding.

13. A method for source routed forwarding, the method comprising:

receiving, by a controller, a request to configure an inter-domain path between a source node and a destination node for a traffic flow, the inter-domain path being a source-routed path traversing a route specified by the source node;

obtaining, by the controller, a path identifier of an intra-domain path segment extending through a domain, the intra-domain path segment representing a portion of the inter-domain path;

constructing a source route hop list that specifies the path identifier without specifying individual hops along the intra-domain path segment;

sending the source route hop list to a device, wherein the source route hop list is configured to be appended to a first data packet of the traffic flow at the source node prior to the first data packet being communicated over the inter-domain path, the first data packet preceding every other data packet in the traffic flow; and sending, or prompting another controller to send, a first control message to an edge node in the domain, the first control message instructing the edge node to replace the path identifier with a hop list in a header of the first data packet upon receiving the first data packet over the inter-domain path and prior to forwarding the first data packet over the intra-domain path segment, the hop list specifying a sequence of next-hop addresses along the intra-domain path segment, wherein replacing the path identifier with the hop list at the edge node enables intermediate nodes on the intra-domain path segment to directly read the next-hop addresses along the intra-domain path segment from the header of the first data packet.

14. The method of claim 13, wherein the path identifier excludes information relating to individual hops along the intra-domain path segment.

15. The method of claim 13, the first control message further instructing the edge node to write an entry into a forwarding table that associates the path identifier with a hop list specifying a sequence of hops along the intra-domain path segment.

16. The method of claim 15, wherein the first control message is sent to the edge node prior to the first data packet being communicated over the inter-domain path.

17. The method of claim 16, further comprising:

sending, or prompting another controller to send, a second control message to the edge node after the first data packet is transported over the inter-domain path, wherein the second control message instructs the edge node to remove the entry from the forwarding table.

18. The method of claim 13, wherein the path identifier comprises one of a Multiprotocol Label Switching (MPLS) label, an internet protocol (IP) version four (IPv4) address, an IP version six (IPv6) address, and a type length value (TLV) encoding.

19. A controller comprising:
a processor; and
a computer readable storage medium storing programming for execution by the processor, the programming including instructions to:
receive a request to configure an inter-domain path between a source node and a destination node for a traffic flow, the inter-domain path being a source-routed path traversing a route specified by the source node;
obtain a path identifier of an intra-domain path segment extending through a domain, the intra-domain path segment representing a portion of the inter-domain path;
construct a source route hop list that specifies the path identifier without specifying individual hops along the intra-domain path segment;
send the source route hop list to a device, wherein the source route hop list is configured to be appended to a first data packet at the source node prior to the first data packet being communicated over the inter-domain path, the first data packet preceding every other data packet in the traffic flow; and
send, or prompt another controller to send, a first control message to an edge node in the domain, the first control message instructing the edge node to replace the path identifier with a hop list in a header of the first data packet upon receiving the first data packet over the inter-domain path and prior to forwarding the first data packet over the intra-domain path segment, the hop list specifying a sequence of next-hop addresses along the intra-domain path segment, wherein replacing the path identifier with the hop list at the edge node enables intermediate nodes on the intra-domain path segment to directly read the next-hop addresses along the intra-domain path segment from the header of the first data packet.

20. The controller of claim 19, wherein the path identifier comprises one of a Multiprotocol Label Switching (MPLS) label, an internet protocol (IP) version four (IPv4) address, an IP version six (IPv6) address, and a type length value (TLV) encoding.

* * * * *